(12) United States Patent
Schuh et al.

(10) Patent No.: US 9,570,782 B2
(45) Date of Patent: Feb. 14, 2017

(54) STORAGE ELEMENT AND METHOD FOR THE PRODUCTION THEREOF

(75) Inventors: Carsten Schuh, Baldham (DE); Thomas Soller, Landau/Isar (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 79 days.

(21) Appl. No.: 14/239,141

(22) PCT Filed: Sep. 3, 2012

(86) PCT No.: PCT/EP2012/067107
§ 371 (c)(1),
(2), (4) Date: Feb. 16, 2014

(87) PCT Pub. No.: WO2013/045209
PCT Pub. Date: Apr. 4, 2013

(65) Prior Publication Data
US 2014/0205918 A1    Jul. 24, 2014

(30) Foreign Application Priority Data

Sep. 27, 2011  (DE) .................. 10 2011 083 539
Oct. 26, 2011  (DE) .................. 10 2011 085 224

(51) Int. Cl.
*H01M 12/08* (2006.01)
*H01M 4/38* (2006.01)
(Continued)

(52) U.S. Cl.
CPC .............. *H01M 12/08* (2013.01); *H01M 4/38* (2013.01); *H01M 4/50* (2013.01); *H01M 4/523* (2013.01);
(Continued)

(58) Field of Classification Search
None
See application file for complete search history.

(56) References Cited

U.S. PATENT DOCUMENTS 5,445,903 A    8/1995   Cable et al.
9,048,498 B2 * 6/2015   Muecke ............. H01M 4/8636
              (Continued)

FOREIGN PATENT DOCUMENTS

CN       1133648 A     10/1996
CN     102164652 A      8/2011
              (Continued)

OTHER PUBLICATIONS

CN Office Action, dated Jun. 29, 2016, for CN application No. 201280047269.4.

*Primary Examiner* — Jonathan Crepeau
(74) *Attorney, Agent, or Firm* — Beusse Wolter Sanks & Maire

(57) ABSTRACT

A storage element for a solid electrolyte battery is provided. The storage element has a main member having a porous matrix of sintered ceramic particles in which particles that are made of a metal and/or a metal oxide and jointly form a redox couple are embedded. Along a preferred direction, the storage element has a certain concentration gradient of the particles made of the metal and/or the metal oxide and/or a certain gradient of a pore density and/or a pore size, thereby allowing the diffusion behavior of oxygen ions within the main member to be controlled and thus the charge and discharge kinetics, the life and the capacity of the battery to be improved.

18 Claims, 1 Drawing Sheet

(51) Int. Cl.
  *H01M 10/39* (2006.01)
  *H01M 4/50* (2010.01)
  *H01M 4/52* (2010.01)
  *H01M 4/80* (2006.01)
  *H01M 4/02* (2006.01)

(52) U.S. Cl.
  CPC ............ *H01M 4/801* (2013.01); *H01M 4/803* (2013.01); *H01M 10/39* (2013.01); *H01M 2004/021* (2013.01)

(56) References Cited

U.S. PATENT DOCUMENTS

| | | |
|---|---|---|
| 2004/0202924 A1 | 10/2004 | Bai |
| 2005/0069756 A1 | 3/2005 | Robert et al. |
| 2006/0040153 A1* | 2/2006 | Tokoi ............... H01M 8/04007 429/423 |
| 2010/0279194 A1 | 11/2010 | Elangovan |
| 2011/0177407 A1 | 7/2011 | Majima et al. |
| 2012/0058396 A1 | 3/2012 | Harter |

FOREIGN PATENT DOCUMENTS

| | | |
|---|---|---|
| DE | 68918580 T2 | 8/1995 |
| DE | 69430634 T2 | 10/2002 |
| EP | 0721675 B1 | 5/2002 |
| EP | 1513214 A1 | 3/2005 |
| EP | 2335807 A1 | 6/2011 |
| WO | 2011019455 A1 | 2/2011 |
| WO | WO 2011060756 * | 5/2011 |
| WO | 2012021269 A1 | 2/2012 |
| WO | 2012177356 A1 | 12/2012 |

\* cited by examiner

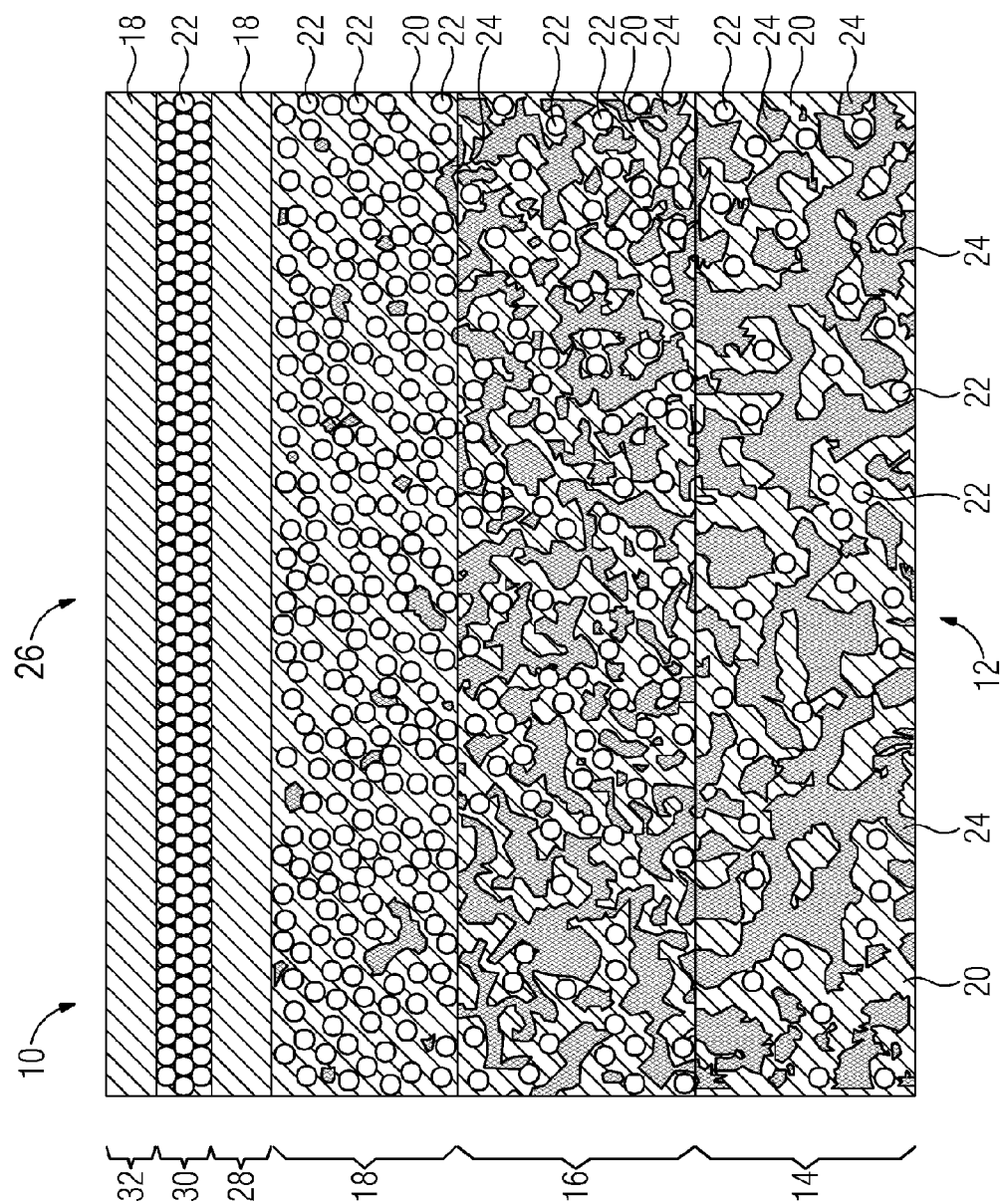

STORAGE ELEMENT AND METHOD FOR THE PRODUCTION THEREOF

CROSS REFERENCE TO RELATED APPLICATIONS

This application is the US National Stage of International Application No. PCT/EP2012/067107 filed Sep. 3, 2012, and claims the benefit thereof. The International Application claims the benefit of German Application No. DE 102011083539.3 filed Sep. 27, 2011 and German Application No. DE 102011085224.7 filed Oct. 26, 2011. All of the applications are incorporated by reference herein in their entirety.

FIELD OF INVENTION

The invention relates to a storage element for a solid electrolyte battery, and to a method for the production of such a storage element.

BACKGROUND OF INVENTION

Solid electrolyte batteries are based on the principle of solid electrolyte fuel cells, which are enhanced by adding storage elements to the battery. These storage elements conventionally have ceramic base bodies in which particles of a metal and/or a metal oxide, which together form a redox pair, are incorporated. In the charged state of the battery, the particles are in this case reduced to the metal. By electrochemical oxidation with atmospheric oxygen, it is possible to obtain energy which can be drawn as electrical energy at the tapping poles of the battery. Once the metal particles have been fully oxidized to the respective metal oxide, the battery is discharged. In order to recharge the battery, the fuel cell is then operated in electrolysis mode, hydrogen which reduces the metal oxides back to the metal being formed.

In the manufacture of such batteries, the problem arises of exploiting the theoretically existing storage capacity of the storage elements as effectively as possible, and of permitting a discharging characteristic in potentiometric or galvanostatic operation which is as constant as possible. It is furthermore of great importance to ensure longterm stability both under charging/discharging cycles and in standby operation.

Of great importance in this case is the accessibility of the active metal species in the storage element for the redox reaction, which in particular influences the degree of utilization and the reaction kinetics of the charging and discharging process, as well as the susceptibility to degradation.

Hitherto conventional storage elements have an isotropic skeleton-like structure of the ceramic base body with uniformly distributed open, or closed pores. In order to prevent losses of the storage capacity by sintering of the reactive metal particles together, and concomitant reduction of the available active surface area, so-called ODS (oxide dispersion strengthened) metal particles are mostly used nowadays, which are mixed with coarse-grained zirconium dioxide, dry-pressed and slightly sintered.

SUMMARY OF INVENTION

It is an object of the present invention to provide a storage element and a method for the production of such a storage element, by means of which it is possible to produce a solid electrolyte battery with particularly good stability, capacity and uniform charging and discharging kinetics.

This object is achieved by a storage element as described herein and by a method having the features described herein.

Such a storage element for a solid electrolyte battery comprises a base body having a porous matrix of sintered ceramic particles, in which particles of a metal and/or a metal oxide, which together form a redox pair, are incorporated. According to aspects of the invention, along a preferred direction, the storage element in this case has a concentration gradient of the particles of the metal and/or the metal oxide, and/or a gradient of a pore density and/or a pore size.

By such a variation of the active surface area of the particles of the metal and/or metal oxide, or the accessibility due to variation of the porosity, in particular the discharging and charging characteristics of a battery having such a storage element are improved.

It is particularly expedient in this case for the amount of reactive metal particles to increase with an increasing distance from the electrolyte of the battery so that the progress of the redox reaction, retarded because of diffusion with an increasing distance from the electrolyte, is compensated for by an increased availability of reaction partners. At the same time, by varying the degree of porosity inside the storage element, the accessibility over the volume of the storage element can be controlled and the usable storage volume can thus be increased by reducing the diffusion resistances for oxygen ions diffusing in.

The mutual separation of the metal and/or metal oxide particles embedded in the ceramic matrix furthermore prevents them from being sintered together, so that the longterm stability and lifetime of a battery having such a storage element are improved.

To this end, it is advantageous in particular that, away from the solid electrolyte along the preferred direction, the concentration of the particles of the metal and/or the metal oxide increases and the pore density and/or the pore size decrease, so that the effects explained above of the inward diffusion of the reaction gases being made more difficult with an increasing distance from the electrolyte can be counteracted particularly well.

Expediently, the concentration gradient and/or the gradient of the pore density and/or pore size are stepped gradients. Such structures are particularly simple to achieve in terms of production technology, so that such a storage element can be manufactured particularly economically.

Preferably, the storage element has a peripheral metal layer, to which the preferred direction forms a surface normal. In the installed position of the storage element, this expediently faces away from the electrolyte of the solid electrolyte battery. Such a metal layer can act as a sacrificial layer which becomes sintered in the event of ingress of molecular oxygen from leaks of the cell structure, so that the underlying useful storage volume is sealed against further attacks.

It is particularly expedient in this case to surround this sacrificial layer on both sides with ceramic layers which are at least predominantly free of pores and of particles of the metal and/or the metal oxide. These layers act as barrier layers which can counteract inward diffusion of undesired entering molecular oxygen.

Preferably, the ceramic particles have a redox-inert material, in particular of $Al_2O_3$, MgO or $ZrO_2$. Such ceramics are particularly stable in relation to the operating conditions of a solid electrolyte battery, so that a battery having a particularly long lifetime is achieved. Expediently, these ceramic particles have a median particle size d50 of less than 1 μm.

The particles of the metal and/or the metal oxide preferably comprise iron, nickel or manganese and/or the respective oxides. Of course, any other desired metal/metal oxide pairs or other redox pairs, which are stable under the operating conditions of a solid electrolyte battery, may also be employed. Compared with the ceramic particles, the particles of the metal and/or metal oxide preferably have a somewhat larger median particle size d50 of from 1 to 10 μm. The smaller ceramic particles can then coat the surface of the particles of the metal and/or the metal oxide, preferably in a monolayer, and form spacer elements which separate the particles of the metal and/or the metal oxide from one another in the matrix, so as to prevent the metal particles from being sintered together. This reduces the susceptibility of the storage element to degradation and therefore increases the lifetime of a battery having such a storage element.

The invention furthermore relates to a method for the production of a storage element for a solid electrolyte battery, in which a first slip of ceramic particles and particles of a metal and/or a metal oxide, which together form a redox pair, as well as a pore forming agent, are provided and shaped to form a green body which is subsequently sintered.

According to aspects of the invention, at least one further slip of ceramic particles and particles of the metal and/or the metal oxide, as well as a pore forming agent, are provided, which differs from the first slip in the proportion of pore forming agents and/or in the proportion of metal and/or metal oxide. One subregion of the green body is in this case formed from the first slip and at least one subregion of the green body is formed from the at least one further slip.

This makes it possible to provide different subregions of the green body—and therefore of the finished storage element—with different physical properties. In particular when a multiplicity of different slips, which differ gradually in the proportion or in the size of pore forming agents and/or in the proportion of the particles of the metal and/or metal oxide, are used, it is possible to construct a green body and therefore a storage element with corresponding property gradients so that the advantages explained with reference to the storage element according to the invention can be achieved.

In a particularly preferred embodiment of the invention, in order to form the green body, a first green sheet is initially produced on a support by sheet casting of the first slip. Subsequently, at least one further green sheet is manufactured on a support by sheet casting of the at least one further slip.

The green sheets are then removed from the respective supports, and a multiplicity of green sheet sections are stacked to form the green body and subsequently laminated and debindered. A first subregion of the green body is formed by stacking sheet sections of the first green sheet and at least one further subregion of the green body is formed by stacking sheet sections of the second green sheet.

By using sheet casting to construct thin green sheets and subsequently stacking these, a particularly finely graded variation in the properties of the green body over its volume can be achieved. In the extreme case, a separate green sheet with its own properties is used for each individual sheet layer, so that almost continuous gradients of the pore density, pore size or metal concentration in the finished storage element can be achieved. Sheet casting is furthermore a production method which is particularly reliable and economical—and therefore compatible with mass production—with which even extremely thin sheets, for example in the μm range, can be manufactured.

In another configuration of the invention, in total three green sheets are formed from respectively assigned slips. The first slip in this case contains 50 vol % of metal and/or metal oxide and 10 vol % of pore forming agent, the second slip contains 35 vol % of metal and/or metal oxide and 20 vol % of pore forming agent, and the third slip contains 20 vol % of metal and/or metal oxide and 30 vol % of pore forming agent, the remainder of the slips respectively being formed by ceramic particles.

In this way, it is possible to set up in an extremely simple way a stepped gradient of the pore density and metal concentration in the green body which is already sufficient to achieve the advantages explained with reference to the storage element according to the invention.

In order to construct the actual green body, in this case, firstly a multiplicity of sheet sections of the first green sheet followed by a multiplicity of sheet sections of the second green sheet, followed by a multiplicity of sheet sections of the third green sheet are stacked.

In order to obtain a further improved storage element, advantageously, a ceramic slip, the particle constituents of which exclusively comprise ceramic particles, and a metal slip, the particle constituents of which exclusively comprise particles of the metal, may additionally be provided, and corresponding green sheets may be produced from the slips.

After formation of the green body from the first and the at least one further green sheet, a multiplicity of sheet sections of the green sheet produced from the ceramic slip, followed by a multiplicity of sheet sections of the green sheet produced from the metal slip, followed by a multiplicity of sheet sections of the green sheet produced from the ceramic slip, are then additionally stacked on the green body. After debindering and sintering of such a green body, a storage element is therefore obtained which, at an interface, has a layer sequence of a purely ceramic layer followed by a purely metallic layer followed by a further purely ceramic layer. This is the combination, already explained with reference to the storage element according to the invention, of barrier and sacrificial layers which stabilize the storage element against the ingress of molecular oxygen.

Preferably, ceramic particles have a redox-inert material, in particular of $Al_2O_3$, $MgO$ or $ZrO_2$, having a median particle size d50 of less than 1 μm, are used. Particles of iron, nickel or manganese and/or the respective oxides, with a median particle size d50 of from 1 to 10 μm, are preferably used as particles of the metal and/or the metal oxide, so as to form the matrix explained above having separated metal particles in ceramic embedding, which has an extremely low susceptibility to further sintering under the operating conditions of a solid electrolyte battery.

Natural fibers, carbon particles or cellulose particles, having a median particle size d50 of from 10 to 50 μm, may be used as pore forming agents. These particles can be burnt, or pyrolyzed, while leaving almost no residues during the sintering of the green body, and therefore generate the desired pores without contaminating the matrix of the storage element.

BRIEF DESCRIPTION OF THE DRAWINGS

The invention and its embodiments will be explained in more detail below with the aid of the drawing.

The single FIGURE shows a schematic cross-sectional representation through an exemplary embodiment of a storage element according to the invention for a solid electrolyte battery.

DETAILED DESCRIPTION OF INVENTION

A storage element, denoted overall by 10, for a solid electrolyte battery has a multilayer structure. Starting from the side 12, which faces toward the electrolyte in the installed state of the storage element 10, this is initially followed by three layers 14, 16, 18 on one another, each of which has a ceramic matrix 20 with embedded metal particles 22, not all of the metal particles 22 being labeled for the sake of clarity. The layers 14, 16, 18 furthermore have pores 24, likewise not all of which are denoted.

As can be seen from the FIGURE, the density of the metal particles 22 increases with an increasing distance from the side 12 facing toward the electrolyte, while at the same time the size and number of the pores 24 decreases. The diffusion resistance for oxygen ions entering the storage element 10 from the electrolyte can be controlled by the gradient of the pore density. This is important since the reaction of these oxygen ions with metal particles 22 is the basic mechanism of the energy release in the storage element 10. The electrochemical oxidation of the metal particles 22 with the oxygen ions generates energy which can be drawn from the electrodes of a solid electrolyte battery having such a storage element 10. By corresponding control of the diffusion resistances by means of the pore size gradients over the layers 14 to 18, the availability of the metal particles 22 for the reaction is significantly improved.

The increase in the density of the metal particles 22 in the layers 14 to 18 furthermore compensates for the progress of the redox reaction being retarded because of diffusion with an increasing distance from the electrolyte. In this way, linearization respectively of the charging and discharging characteristics of a solid electrolyte battery having such a storage element 10 can be achieved.

On the side 26 of the storage element facing away from the electrolyte, the layer 18 is initially followed by a full ceramic layer 28, then a fully metallic layer 30 and another full ceramic layer 32. The full ceramic layers 28 and 32 form a diffusion barrier for molecular oxygen, which could enter in the event of leaks in the battery housing. If molecular oxygen species are nevertheless able to penetrate through the outer barrier 32, then they oxidize the fully metallic layer 30 and therefore lead to the metal particles 22 contained therein being sintered together. This blocks further diffusion of subsequent oxygen molecules. In this way, damage to the actually reactive layers 14 to 18 in the event of ingress of small amounts of molecular oxygen is avoided, so that the storage element 10 is particularly stable and has a long lifetime.

Further to the stability of the storage element 10, the separation of the metal particles 22 in the ceramic matrix 20 contributes to preventing the metal particles 22 from being sintered together during operation of the storage element 10, and therefore sustains the large reactive surface area of the storage element 10.

In order to produce such a storage element, a separate slip is firstly provided for each of the layers 14 to 18 and 28 to 32. For the layers 28 to 32, which are constructed fully ceramically, the slip having 100% matrix material, preferably aluminum oxide particles, magnesium oxide particles or zirconium oxide particles having a median particle size d50 of less than 1 μm. The purely metallic layer 30 is formed from redox-active metal particles, for example iron, nickel or manganese having a median particle size d50 of from 1 to 10 μm.

For the slips subsequently forming the layers 14 to 18, ceramic particles, metal particles and additional pore forming agents are used. The slip for forming the layer 14 has from 5 to 20 vol % metal particles, 20 to 30 vol % of pore forming agents the remainder being ceramic particles. The slip for the layer 6 comprises from 25 to 30 vol % metal particles, 10 to 20 vol % of pore forming agents and likewise ceramic particles as the remainder. Lastly, the slip for the layer 18 comprises from 35 to 50 vol % metal particles, 0 to 10 vol % of pore forming agents and likewise a ceramic matrix as the remainder. Natural fibers, carbon particles or glass/carbon particles or cellulose spheres having a d50 of from 10 to 50 μm may be used as pore forming agents in this case.

From the respective slips, corresponding green sheets are initially produced on a support by the sheet casting method. After removal of the support, these can be cut into sections. In order to produce the storage element 10, a green body is then initially formed. To this end, the sheet sections formed from the slip for constructing the layer 14 are initially stacked to the desired level, followed by sheet sections of the green sheet formed from the slip for constructing the layer 16, followed by sheet sections of the green sheet made from the slip for constructing the layer 18.

On this sheet assembly stacked to the desired level, a number of purely ceramic sheets followed by a number of purely metallic sheets, followed by a further number of purely ceramic, are then stacked in order to construct the layers 28 to 32. The finished sheet stack is laminated and debindered, and finally sintered at suitable temperatures in order to obtain the storage element 10. In this way, a structured storage body which has the desired gradients of pore density, pore size and metal concentration, and is protected on one side by barrier and sacrificial layers, can be produced in a particularly straightforward way.

The invention claimed is:

1. A storage element for a solid electrolyte battery, having:
   a base body comprising a porous matrix of sintered ceramic particles, in which particles of a metal and/or a metal oxide, which together form a redox pair, are incorporated,
   wherein along a preferred direction, the base body has a concentration gradient of the particles of the metal and/or the metal oxide, and/or a concentration gradient of a pore density and/or a pore size,
   wherein the storage element has a peripheral metal layer, to which the preferred direction forms a surface normal, and
   wherein the peripheral metal layer is surrounded on both sides with ceramic layers which are at least predominantly free of pores and of the particles of the metal and/or the metal oxide.

2. The storage element as claimed in claim 1,
   wherein the concentration gradient and/or the concentration gradient of the pore density and/or the pore size are stepped concentration gradients.

3. The storage element as claimed in claim 1,
   wherein the ceramic particles comprise a redox-inert material.

4. The storage element as claimed in claim 1,
wherein the ceramic particles have a median particle size d50 of less than 1 μm.

5. The storage element as claimed in claim 1,
wherein the particles of the metal and/or the metal oxide comprise Fe, Ni or Mn and/or the respective oxides.

6. The storage element as claimed in claim 1,
wherein the particles of the metal and/or the metal oxide have a median particle size d50 of from 1 to 10 μm.

7. A method for the production of a storage element for a solid electrolyte battery, comprising
shaping a first slip of ceramic particles and particles of a metal and/or a metal oxide, which together form a redox pair, as well as a pore forming agent to form a green body which is subsequently sintered,
wherein at least one further slip of ceramic particles and the particles of the metal and/or the metal oxide, as well as a pore forming agent, are used, which differs from the first slip in a proportion of pore forming agents and in a proportion of the metal and/or the metal oxide,
wherein one subregion of the green body is formed from the first slip, and at east one subregion of the green body is formed from the at least one further slip,
forming a protective metal sheet made from a protective metal slip exclusively comprising the particles of the metal, and surrounding the protective metal sheet on both sides with ceramic sheets made from ceramic slips exclusively comprising ceramic particles and which are at least predominantly free of pores and of the particles of the metal and/or the metal oxide,
wherein along a preferred direction, the storage element has a concentration gradient of the particles of the metal and/or the metal oxide, and/or a concentration gradient of a pore density and/or a pore size, and
wherein the preferred direction forms a surface normal to the protective metal sheet.

8. The method as claimed in claim 7,
wherein in order to form the green body, a first green sheet is initially produced on a support by sheet casting of the first slip, and at least one further green sheet is produced on a support by sheet casting of the at least one further slip, the respective supports are subsequently removed and a multiplicity of green sheet sections are stacked to form the green body and subsequently laminated and debindered, a first subregion of the green body being formed by stacking sheet sections of the first green sheet and at least one further subregion of the green body being formed by stacking sheet sections of the at least one further green sheet.

9. The method as claimed in claim 8,
wherein in total three green sheets are formed from respectively assigned slips.

10. The method as claimed in claim 9,
wherein the first slip contains 50 vol % of the metal and/or the metal oxide and 10 vol % of the pore forming agent, the at least one further slip contains 35 vol % of the metal and/or the metal oxide and 20 vol % of the pore forming agent, and a third slip contains 20 vol % of the metal and/or the metal oxide and 30 vol % of the pore forming agent.

11. The method as claimed in claim 10,
wherein in order to form the green body, first a multiplicity of sheet sections of the first green sheet followed by a multiplicity of sheet sections of the at least one further green sheet, followed by a multiplicity of sheet sections of a third green sheet comprising the third slip are stacked.

12. The method as claimed in claim 7,
wherein the protective metal sheet comprises a multiplicity of the protective metal sheets, and wherein the both sides of the protective metal sheets are surrounded with a multiplicity of the ceramic sheets which are at least predominantly free of pores and of the particles of the metal and/or the metal oxide.

13. The method as claimed in claim 7,
wherein ceramic particles comprising a redox-inert material having a median particle size d50 of less than 1 μm, are used.

14. The method as claimed in claim 7,
wherein particles of Fe, Ni or Mn and/or the respective oxides, with a median particle size d50 of from 1 to 10 μm, are used as the particles of the metal and/or the metal oxide.

15. The method as claimed in claim 7,
wherein natural fibers, carbon particles or cellulose particles, having a median particle size d50 of from 10 to 50 μm, are used as pore forming agents.

16. The storage element as claimed in claim 3, wherein the redox-inert material comprises $Al_2O_3$, MgO or $ZrO_2$.

17. The method as claimed in claim 13, wherein the redox-inert material comprises $Al_2O_3$, MgO or $ZrO_2$.

18. The storage element as claimed in claim 1,
wherein along the preferred direction, the concentration gradient of the particle of the metal and/or the metal oxide increases and the pore density and/or the pore size decrease.

* * * * *